July 31, 1945. R. H. PREWITT 2,380,581
AIRCRAFT
Filed Oct. 11, 1933 2 Sheets-Sheet 1
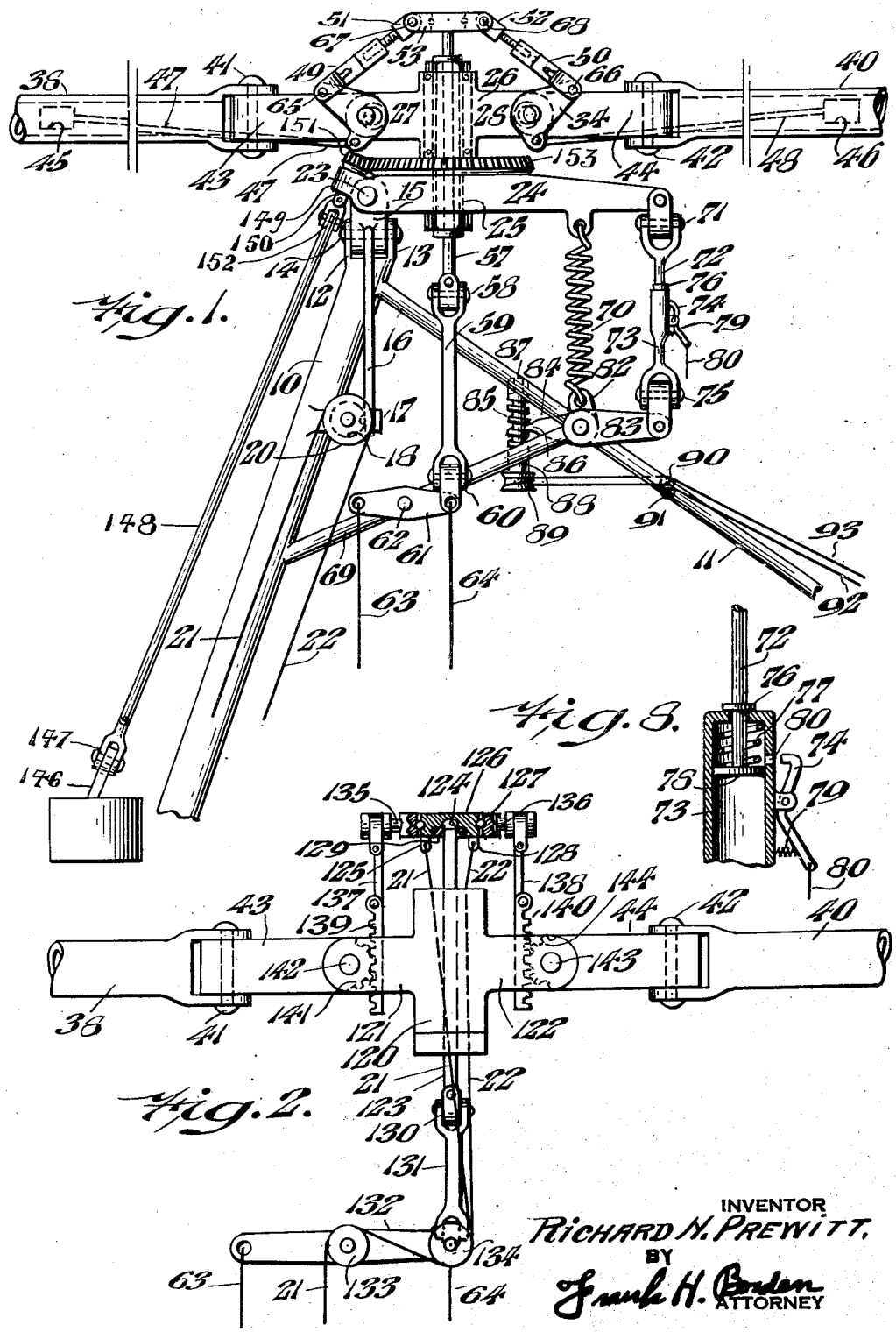
INVENTOR
RICHARD H. PREWITT,
BY
Frank H. Borden
ATTORNEY July 31, 1945.  R. H. PREWITT  2,380,581
AIRCRAFT
Filed Oct. 11, 1933  2 Sheets-Sheet 2
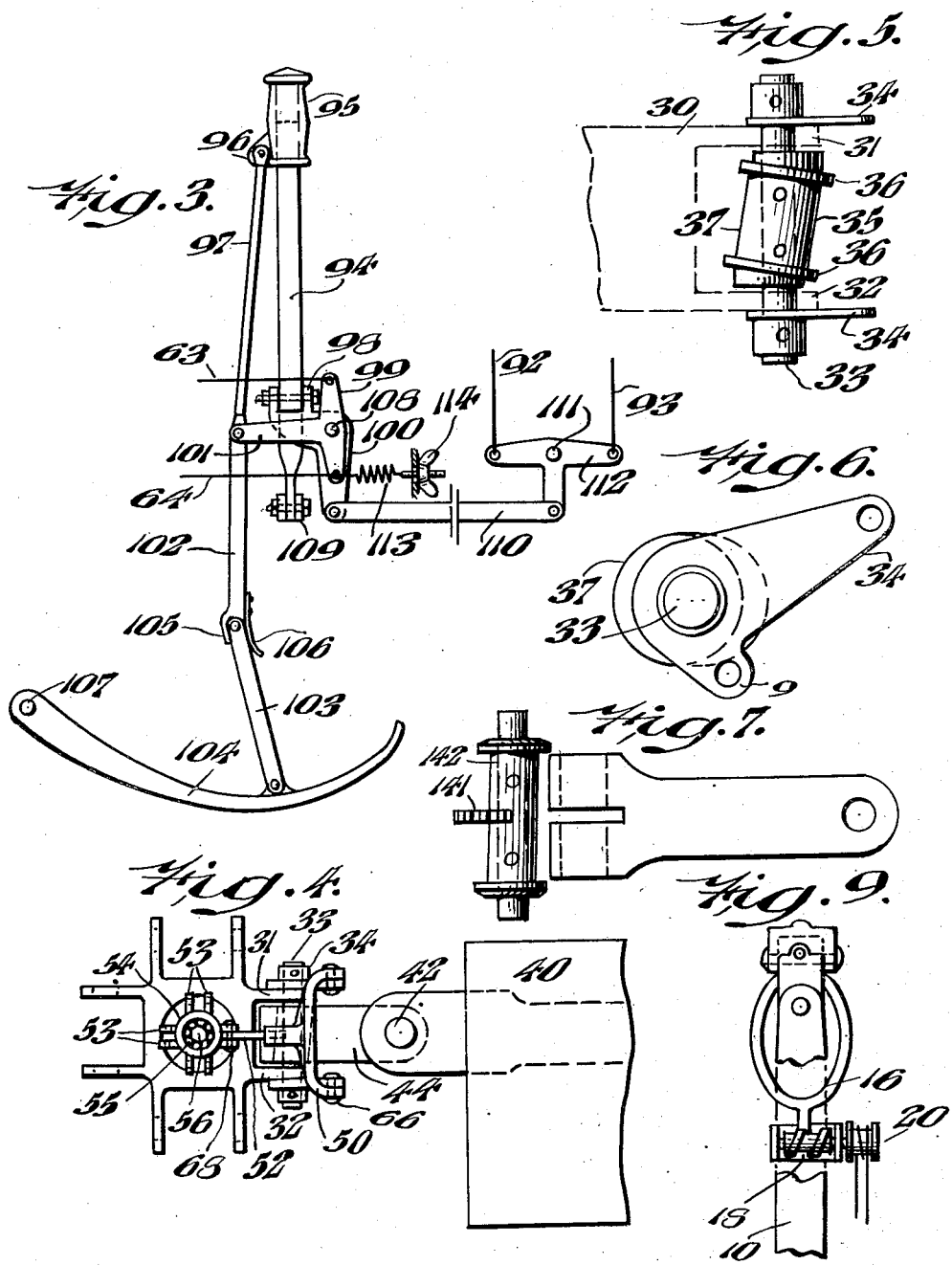
INVENTOR
RICHARD H. PREWITT,
BY
Frank H. Borden
ATTORNEY Patented July 31, 1945

2,380,581

UNITED STATES PATENT OFFICE 2,380,581

AIRCRAFT

Richard H. Prewitt, Lansdowne, Pa., assignor to Autogiro Company of America, Philadelphia, Pa., a corporation of Delaware Application October 11, 1933, Serial No. 693,051

47 Claims. (Cl. 244—18)

My invention relates to aircraft, especially rotary-wing aircraft, and more particularly to aircraft provided with normally aerodynamically rotated blades, or wings, and generally designated "Autogiro."

The Autogiro has been developed to a stage where it affords a safe, useful means of transportation. With the inclusion of a rotor control, the pilot will have control over the roll and pitch of the craft at very low speeds of flight or in vertical descent. The handicaps that present themselves to the Autogiro (as heretofore known) are two-fold: First—the speed of vertical descent increases very rapidly as the horizontal speed approaches zero. The effects of landing with increased vertical velocity are obvious; not only will the landing impact become disagreeable, but also the loads imposed on the structure will be greater, with a consequent necessary increase in weight of the structure and decrease in performance of the craft. Second—the craft will not be able to take off from the same restricted space, or area, such as a back yard, into which it lands. At present, the only available method of shortening the take-off run is by increasing the engine horse-power, or by decreasing the power loading; but apparently this method is approaching its economical limit.

My invention has among its objects to utilize the kinetic energy available in a rotor revolving at speeds greater than normal for boosting the craft off the ground for the "take-off," and for decreasing the speed of and cushioning the descent for landing. I propose to accomplish control over the vertical velocities and accelerations of the craft by means of controlling the incidence angles of the blades while the rotor is in motion. A further object of my invention is to provide means of connecting the blade incidence control to the control member of the craft in such manner that upward movement of the usual control member grip will increase the blade incidence angles and conversely downward movements of the control member grip will decrease the blade incidence angles. Still another object of my invention is to provide means of varying the incidence angles of the blades as they move about the central hub, and in this manner control the flapping path of the blades. Another object of my invention is to provide a landing "feeler" which will automatically increase the incidence angles of the blades when it comes in contact with the ground and sharply increase the effective lift, and in this manner provide that extremely light landings may be made without the attention of the pilot. A further object is to provide governing means in cooperation with my blade incidence control which will tend to maintain constant rotational speed of the rotor. Another object of my invention is to reduce the induced drag of the blade elements when starting the rotor and in this manner reduce the horse-power required to "rev-up" the rotor to a given speed. Still another object of my invention is to provide means of reducing the shocks normally occurring in bumpy air.

These and other objects of my invention will hereinafter more fully appear.

The rotor system of an Autogiro may be likened to a huge flywheel capable of retaining kinetic energy for a limited time. A rotor system revolving at twice its normal rotational speed will have four times as much kinetic energy as when rotating at normal speed, and therefore ¾ of the kinetic energy will be available for exerting added lift to the craft. If the rotor blades are set at zero lift when the rotor is being "revved-up," there will be no downwash, or induced drag; consequently, the horse-power required for revving up the rotor will be greatly reduced. Furthermore, if the blade incidence of all blades in a rotor system are suddenly and simultaneously increased from the angle of attack of no lift to an angle of attack of maximum L/D when the rotor is revolving at twice its normal rotational speed, the Autogiro will be suddenly boosted off the ground, and with a slight forward speed, the stored "free wheeling" rotor energy, in cooperation with the propeller thrust, will be great enough to continue lifting the craft up to a height above the tree tops. It is conservatively estimated that a craft so constructed may be boosted to an altitude of 60 feet in the brief time of 3 seconds, and the forward speed of the craft will be great enough to maintain level flight at the end of the ascension period. I wish it to be made clear that I propose to increase the thrust of the rotor by energy which is imparted to it while on the ground rather than by the method of continually supplying energy to it, and thereby avoid the necessity of providing "anti-torque" means.

In landing the craft, a similar phenomenon takes place, except that the rotor is rotated to speeds greater than normal by aerodynamic means rather than by external means. The autorotational speeds of a rotor vary inversely with the static pitch angles of the blades. That is, the rotor turns faster when the pitch angles are reduced and slower when the pitch angles are increased. The vertical speed of descent increases slightly as the rotational speed of the rotor is increased, but the kinetic energy of a rotor increases as the square of the rotational speed. Thus it is apparent that the added kinetic energy in an aerodynamically driven rotor rotated to speeds greater than normal is greater than the increase in vertical kinetic energy resulting from the change in pitch angles of the blades. It is conservatively estimated that the difference in the kinetic energies is great enough to entirely cushion a vertical descent landing. It is also recognized that the ground effect on the "free wheeling" rotor will act to the advantage of this method of making a landing.

The method employed in making such a landing is as follows: At some predetermined altitude, the pilot decreases the pitch angles of the blades by depressing the control member grip, and as a result, the rotational speed of the rotor increases above normal. At a predetermined distance above the ground with the rotor turning at an "over-revving" speed, the pilot increases the blade incidence by raising the control member grip. Simultaneously the rotor thrust is increased and deceleration of the vertical velocity of the craft takes place. The latter operation may be automatically controlled by a landing "feeler" which actuates the blade incidence control when coming in contact with the ground. Such a feeler may be actuated by a part of the landing chassis or by separate means, but in either case added lift in the rotor system resulting from the increased blade incidence will promote light landings.

The natural flapping movements of hingedly mounted rotor blades has the effect of increasing or decreasing the angles of attack of the blade elements. When the blade flaps up, the angles of attack of the blade elements are decreased, and when the blade flaps down, the angles of attack of the blade elements are increased. By means of bodily varying the incidence angles of the blades as they move about the cycle, I have provided means of changing the flapping path of the blades in such manner as to cause the blade to flap as desired. In general it is desirable to reduce the flapping, but it may be equally desirable to change the phase angle at which the flapping is a maximum or to vary the flapping for the consideration of constant lift—all of which may be accomplished by means of varying the blade incidence angles as the blades move around the hub. Another object of controlling the incidence angles of the blades as they move around the central hub is to provide an improved means of controlling the pitch and roll of the craft. This improved rotor control may be used in combination with the "booster control" and with the present type rotor control if desired. The resultant thrust produced by a rotor is equal in magnitude and direction to the summation of the centrifugal tension in the blades comprising the rotor system. The magnitude is approximately proportionately equal to the weight of the craft but the position and direction of the resultant thrust vector varies with the flapping path of the blades. The relative position of the resultant rotor thrust vector and the center of gravity of the craft forms a basis for a direct controlled machine and since the flapping path of the blades control the position and direction of the resultant thrust vector, the flapping path of the blades may be varied to control the attitude of the craft in pitch and roll. In combination with this improved method of controlling the pitch, roll, and vertical velocities of the craft, the old method of controlling the rotor by bodily moving the rotor as a whole could be used in cooperation with non-reversing means and in the same sense as a stabilizer adjustment on an airplane.

It is customarily desirable to design an aircraft control so that it will tend to return to a neutral position and I have incorporated this feature in my blade incidence control in combination with a safety device. As stated above, the auto-rotational speed of a rotor varies inversely with the static pitch angles of the blades. Thus the auto-rotational speed of a rotor may be controlled by controlling the pitch angles of the blades, or conversely the blade pitch angle adjustment may be used as a governor for maintaining a tendency for constant rotational speed of the rotor. For my governing device, I have weights located in the blades which are acted upon by centrifugal forces resulting from the rotation of the rotor. The weights are attached to the corresponding blade incidence adjustment through cables in such manner as to tend to increase the incidence angle of the blade by the action of the centrifugal tension in the cables. Biased against the action of the centrifugal weight is an adjustable spring or elastic means. By this arrangement, the rotor tends to rotate at a constant speed until disturbed by the pilot.

In the accompanying drawings forming a part of this description:

Fig. 1 represents a fragmentary side elevation of a rotary wing system with rotor control and means for simultaneously varying the incidence angles, and lift, of the blades according to this invention, Fig. 2 represents a similar fragmentary elevation of a modified form of my invention. By the mechanism shown in Fig. 2 the blade incidence angles, and lift, may be varied simultaneously or the incidence and lift may be varied as the blades move about the cycle, Fig. 3 represents a fragmentary elevation of a control system usable with the devices of Figs. 1 and 2, showing a device for cushioning the descent of the aircraft just prior to actual landing, Fig. 4 represents a fragmentary plan of the device shown in Fig. 1. One of the plurality of rotor blades is shown assembled to the hub with a fragmentary plan view of the blade incidence control device, Fig. 5 represents a fragmentary plan of a detail of the eccentric roller used for varying the blade incidence angles, Fig. 6 represents a fragmentary end elevation of Fig. 5. It may be noted from this view, which is co-axial with the inner shaft, that the outer bearing shaft is mounted eccentrically, Fig. 7 represents a disassembled elevation of a modified form of oscillatable axis for the shaft as disclosed in the modification shown in Fig. 2 and employing a gear and ratchet for rotating the eccentric roller shaft, Fig. 8 represents a fragmentary vertical section through a connection of Fig. 1 arranged to permit the absorption of sudden variations in thrust of the rotary wing system, and Fig. 9 represents a fragmentary front elevation of the lateral control arms shown in Fig. 1.

Referring to Fig. 1 a form of support for the rotary wing system of the Autogiro that is of utility of itself is disclosed as supported upon a main or major strut 10 which may be laterally braced by subordinate struts or the like 11 having a yoke formed of spaced cheeks 12, 13 at the upper end in which a transverse support pin 14 is journalled. A rockable block 15 mounted on the pin 14 has depending arms 16, arranged to straddle the strut 10 coupled at their lower ends in a lug or stud 17 engaged to the teeth of a worm wheel 18 driven by pulley 20 through cables 21 and 22, operation of which causes block 15 to be swung arcuately about axis of pivot pin 14.

The upper part of block 15 has a bore to receive a secondary pivot pin 23 upon which is journalled the transverse lever arm 24 rigidly carrying the tubular shaft 25, perpendicular to arm 24 and upon which the hub 26 of the rotary wing system is journalled for both aerodynamic and power driven rotation, as will be explained. Hub 26 has yokes 30 comprising spaced arms 31 and 32 in which transverse substantially horizontal pins 33 (Figs. 4, 5 and 1) are journalled. Rigidly mounted for oscillation with the pivot pins 33, controlled by the bell crank levers 34 is the eccentric oscillatable journal or bearing 35, having shards or flanges 36 to prevent endwise movement of the associated blade coupling but having a cylindrical bearing surface 37 the axis of which is angularly divergent from the axis of pin 33 upon which it is rigidly mounted. It will be understood that rotation of pin 33 will change the relationship of the journal 37 to the horizontal so as to wash in and wash out the angle of incidence of the associated articulated blade. Blades 38 and 40 are coupled through the vertical pivots 41 and 42 with the blade extensions 43 and 44 which are each respectively journalled upon the bearings 37 carried on the respective radial arms 27 and 28.

Weights 45 and 46 located in the blades 38 and 40 are attached to depending arms 9 of the respective bell cranks 34 through cables 47 and 48. It will be recognized that centrifugal force acting on the weights 45 and 46 will place tension in the cables 47 and 48 which, in turn, tends to increase the incidence angle of the associated articulated blade.

The yokes 49 and 50 are attached to the arms 34 at the pivots 65 and 66 at their outboard ends and are adjustably securely attached to stud bolts 51 and 52 at their inboard end.

The adjustable stud bolt members 51 and 52 have a bore at their upper end to receive pins 67 and 68 which pivotally attach members 51 and 52 to spaced arms 53.

The spaced arms 53 are an integral part of a ring 54 which forms an outboard part of the ball race 55. The vertical control shaft 57 carries the inboard bearing of the ball race at its upper end and is prevented from rotating with the ring 54 by its attachment to bell crank 61 through the link 59 and the universal joints 58 and 60. It will be recognized that the universal joints 58 and 60 permit direct control of the rotor head without binding the blade incidence control.

The bell crank 61 is pivotally mounted to the frame member 69 at the pivot 62. Cables 63 and 64 are attached to the ends of the bell crank 61. It will be understood that tension in cable 63 will cause an upward movement in the blade incidence control tube 57 with a consequent upward and inward movement of the arms 34. By this rotation of the shaft 33, the rear center of the surface 37 will move down and the front center of the surface 37 will move up, and the effect will be to simultaneously increase the pitch angles of all blades in the system. Conversely a preponderance of tension in cable 64 will move the blade incidence control shaft 57 downward with a consequent outward and downward movement of the arms 34 and simultaneous decrease in pitch angles of the blades comprising the rotor system.

At the rear end of the lever arm 24 is a spring 70 attached to the lever arm at its upper end and to the frame members 11 and 69 at its lower end. At the extreme rear of lever arm 24 is a universal joint 71 and connecting link comprised of members 72 and 73. Member 72 is attached to the universal joint at 71 and member 73 is attached to the universal joint at 75. The washer 76 is rigidly attached to member 72 and limits the foreshortening of the members 72 and 73. The compression spring 77 carries the tension load in members 72 and 73 by virtue of its installation internally between the end of member 73 and the piston 78.

The small compression spring 79 tends to keep the dog 74 protruding through the aperture 80. It may be noted that the members 72 and 73 are resiliently attached to each other in tension when the dog 74 is removed from the aperture 80, but when the dog 74 is in place above the piston 78 the members 72 and 73 are rigidly attached to each other. Under normal flying conditions, the dog 74 will be held out of the aperture 80 by tension in the cable 81, but when it is desirable to have a rigid attachment of the control member to the rotor head the dog 74 will be permitted to drop through the aperture 80.

A bell crank 82 having arms 83 and 84 is pivotally mounted at the intersection of the frame members 11 and 69. The rear end of arm 83 is pivotally connected to universal joint 75. At the forward end of arm 84 is a lug 86 which engages a worm gear 85, mounted between bearings 87 and 88 rigidly secured to frame members 11 and 69. The pulley 89 is rigidly attached to worm gear 85 and carries control cables 92 and 93 which travel over guide pulleys 91 and 90. Thus it may be seen that tension in cable 92 will rotate the worm gear 85 in a clockwise direction when viewed from the top. This clockwise motion of the worm gear moves the arm 84 downward and the arm 83 upward. In turn, the lever arm 24 rotates upward about the pivot 23 and a diving moment is created by the control movement. Conversely tension in cable 93 will rotate the arm downward about the pivot 23 and consequently a tail heavy moment is created.

Referring to Fig. 3, the control stick 94 is freely pivoted about the fore and aft pin 98 for lateral control of the ship. When the control stick 94 is moved to the right (away from the reader) the lower connection at 109 moves toward the left of the ship or toward the reader and conversely when the control stick is moved to the left the terminal 109 moves toward the right of the ship. Cables 21 and 22 are suitably guided by pulleys which direct one cable to the terminal 109 from the right of the craft and the other cable from the left side of the ship to the terminal 109. The lateral control mechanism and arrangement of attaching cables 21 and 22 to terminal 109 is so arranged that movements of the control stick to the right tilt the rotor head about the pivot 14 in a clockwise direction when viewed from the rear.

The bracket 100 carries the stick in a forked bearing 98 at its upper end and the link 110 at its lower end, the stick 94 and bracket 100 being bodily rotatable about the fixed pivot 108. Forward movement of the control stick puts compression in the member 110 which is attached to the bell crank 112 having a fixed pivot 111 and rotating about said pivot in an anti-clockwise direction causing a tensile load in cable 92. Conversely, rearward movements of the control stick 94 place tension in the cable 93. It may be noted that the action of these cables has been explained under description of Fig. 1.

The tension spring 113 and wing nut 114 are shown in connection with the blade incidence control unit. It was previously explained that weights 45 and 46 were located in the blades for the purpose of automatically tending to increase the co-operating blade incidence adjustment with increasing rotational speed of the rotor. The adjustable spring 113 is biased against the action of the weights 45 and 46 in such manner that the normal rotational speed of the rotor may be varied by varying the tension in the spring 113. That is, the centrifugal force resulting from the rotation of the weights 45 and 46 about the hub 26 varies directly with the rotational speed squared but the tension in the spring 113 varies directly with its deflection. Tension in cables 47 and 48 tends to increase the blade incidence angles and consequently slow down the rotor but when said tensile force gets smaller than the opposing resilient force the blade incidence angles automatically tend to decrease with a consequent increase in rotational speed of the rotor.

As shown in Figure 3, the handgrip 95 is vertically slidable on the control stick 94 and is coupled by the flexible joint 96 to the upper end of a link 97, the lower end of which is similarly flexibly coupled to the free end of bell crank arm 101, whereby the mean blade pitch angle can be raised or lowered (through the intermediation of the cables 63 and 64, etc.) in accordance with the raising or lowering of the handgrip 95. Obviously, this control is superimposed upon the automatic pitch governor means for the blades, and further is controllable irrespective of angular position of the stick 94.

A landing feeler skid shown at 104 and rotatable about the fixed pivot 107, is provided. The elbow unit composed of members 102 and 103 are attached between the skid 104 and the bell crank arm 101. The lip 105 prevents the members 102 and 103 from getting in direct alignment and the flat spring 106 tends to hold the member 103 in as near alignment with member 102 as the lip 105 will permit.

Upon contact with the ground the member 104 rotates upward about the pivot 107 and through members 103 and 102 lifts the lever arm 101. In turn the blade incidence angles are increased with accompanying increase in lift. The action of the elbow joint between members 102 and 103 is to provide a safety break which will cause members 102 and 103 to fold up when excessively end loaded.

The modification shown in Fig. 2 will be clear when it is appreciated that it differs from the form shown in Fig. 1 by the fact that the means for securing simultaneous and similar change of angle of incidence of the blades is selectively operable to oppositely vary the respective angles of incidence or pitch angles to secure predetermined and desired controlling moments from the system. It will be understood that the same or any other desired form of support and power means for driving the modified system, as shown in Fig. 1 for instance, may be provided. The hub 120 is held for rotation with its axis fixed and includes the radial stop elements 121 and 122. It has an axial bore in which a shaft 123 is journalled for sliding vertical movement. This shaft 123 has at its upper end a ball 124 of a ball and socket joint, the complementary portion of which 129 is disposed in an oscillatable inner stationary race member 126. The inner race member 126 has depending radially disposed tabs 125 and 128 to which cables 21 and 22 are attached and to which, at substantially 90°, cables 92 and 93 are attached but not shown. The lower end of shaft 123 connects through universal joint 130 with a link 131 pivoted by a universal joint to the bell crank lever 132 having a fulcrum coincident with the axis of pulley 133. Cables 21 and 22 and 92 and 93 pass over pulleys 133 and pulleys 134, the axis of which latter is coincident with the pivot of bell crank lever 132 with link 131. An end of cable 63 attaches to an end of bell crank lever 132, and cable 64 connects with the other end. The last mentioned cables are operative to oscillate bell crank 132 and through the train of mechanism to raise and lower the gimbal suspension 127 and 126. Radially of the rotatable race member 127, as by stub shafts 135 and 136 there are provided depending pivoted links 137 and 138 pivoted at their lower ends in the vertically slidable racks 139 and 140 journalled in the stub shafts 121 and 122 of the hub 120. Rack 139 is in mesh with the toothed quadrant 141 carried by an eccentric pivotal axis 142 similar in design and construction to the elements 35 and 36 and 37 of Fig. 5, already described. A similar rotatable axis 143 having quadrant 144 is provided in mesh with rack 140. Stub shaft 43 is journalled upon the axis 142 and stub shaft 44 upon axis 143, as in Fig. 1. The rest of the construction is similar. It will be appreciated that vertical movement of shaft 123 upon rocking of bell crank lever 132 will simultaneously and similarly change the pitch angle of the blades mounted upon shafts 38 and 40. As in Fig. 1 the change in angle will be identical in both blades. It will be clear also that with any initial similar pitch angle in blades 38 and 40, that adjustment of the gimbal suspension of Fig. 2 by means of cables 21 and 22, 92 and 93 will cause opposite and equal changes in pitch angle during the rotation of the system. It is contemplated that the same control mechanism already described be applied to the modification of Fig. 2. The construction and advantages of the invention are thought to be obvious.

While the rotary wing system is, during flight, customarily aerodynamically rotated, yet, as noted, power means are to be associated therewith, so as to build up the rotational speed for the purposes already noted. To this end any desired sort of drive may be used. Illustratively, a power driven shaft 146, driven for instance, by the power plant of the aircraft not shown, connects through a vertical lost motion connection and universal joints 147 forming a driving connection with shaft 148. An extension of lever 24, beyond pivot 23 as at 149 forms a journal for a stub shaft 150, having a pinion or bevelled gear 151 on one end, and connecting through universal joints 152, with shaft 148. A ring gear 153 is mounted for rotation with rotor hub 26 and is in mesh with pinion gear 151. The drive is constant despite oscillations of lever 24.

I claim:

1. A rotative-winged aircraft having blades mounted on a central hub and capable of being driven by the relative air flow in flight, means for selectively adjusting the pitch angles of said blades in flight, a control member operated by the pilot in generally fore and aft and lateral directions for correspondingly controlling the attitude of said aircraft, said selective pitch adjusting means being connected to said control member, and auxiliary means cooperating with said first means for collectively adjusting the pitch angles of said blades, said last mentioned means being located on said control member and arranged to be operated by the pilot in a generally vertical direction independently of movement of said control member.

2. A rotative-winged aircraft having blades mounted on a central hub, said hub rockably mounted on trunnions and connected to a movable control member for controlling the attitude of said aircraft, means for adjusting the pitch angles of said blades, and control means for the last mentioned means mounted to move with said control member.

3. Control means, for rotary wing aircraft having a fuselage, comprising a stick universally pivotally mounted relative to said fuselage, means operatively coupled with said stick and responsive to oscillations about said pivotal mounting for effecting lateral and longitudinal selective controlling functions of said rotary wing system, means in said rotary wing system for changing the angle of incidence of the blades, and means mounted upon said stick and operatively associated with said blade incidence changing means and adjustable, independently of stick movement, for manually effecting change of blade incidence.

4. Control means, for rotary wing aircraft having a fuselage, comprising a stick universally pivotally mounted relative to said fulselage, means operatively coupled with said stick and responsive to oscillations about said pivots for effecting lateral and longitudinal selective controlling functions of said rotary wing system, means in said rotary wing system for changing the angle of incidence of the blades, means mounted upon said stick and operatively associated with said blade incidence changing means for manually effecting change of blade incidence, and governing means for urging said blade angle changing means toward a substantially predetermined blade setting.

5. Control means, for rotary wing aircraft having a fuselage, comprising a stick universally pivotally mounted relative to said fuselage, means operatively coupled with said stick and responsive to oscillations about said pivots for effecting lateral and longitudinal selective controlling functions of said rotary wing system, means in said rotary wing system for changing the angle of incidence of the component blades, means mounted upon said stick and operatively associated with said blade incidence changing means for manually regulating the change of blade incidence, governing means for urging said blade changing means toward a predetermined functioning, and resilient means operatively associated with the manual regulating means to vary the rotative speed at which said governing means is effective.

6. In an aircraft, a single sustaining rotor constituting the principal lifting means at least in vertical flight of the craft and comprising a plurality of aeroform blades actuable autorotationally as well as by power, mechanism mounting the blades by their root ends to rotate about a generally upright axis in vertical flight, said mechanism comprising pivotal bearing means providing for pitch change movement of each blade as a unit between a mean autorotational pitch angle and an appreciably higher positive pitch angle and further comprising additional pivotal bearing means providing freedom independently of the operation of the first-mentioned pivotal bearing means for the blades to swing in a direction generally transverse their mean rotative path of travel, power means for positively rotating the rotor blades at such R. P. M. as to store substantial kinetic energy therein with the blades adjusted to a lowered pitch angle and adapted to accommodate free autorotation of said blades at least for descent without power, and controllable means operative to move the blades uniformly to increased pitch angles whereby to utilize such stored kinetic energy when effecting vertical take-off of the craft, together with control means operative to shift opposite blades, as a whole, in opposing directions of pitch change, cyclically with rotation of the rotor, whereby to maneuver the aircraft.

7. In an aircraft, a single sustaining rotor constituting the principal lifting means at least in vertical flight of the craft and comprising a plurality of aeroform blades actuable autorotationally as well as by power, mechanism mounting the blades by their root ends to rotate about a generally upright axis in vertical flight, said mechanism comprising pivotal bearing means providing for pitch change movement of each blade as a unit between a mean autorotational pitch angle and an appreciably higher positive pitch angle and further comprising additional pivotal bearing means providing freedom independently of the operation of the first-mentioned pivotal bearing means for the blades to swing in a direction generally transverse their mean rotative path of travel, power means for positively rotating the rotor blades at such R. P. M. as to store substantial kinetic energy therein with the blades adjusted to a lowered pitch angle and adapted to accommodate free autorotation of said blades at least for descent without power, and controllable means operative to move the blades uniformly to increased pitch angles whereby to utilize such stored kinetic energy when effecting vertical take-off of the craft, together with control means operative through the first-mentioned pitch-change means to shift opposite blades, as a whole, in opposing directions of pitch change, cyclically with rotation of the rotor, whereby to maneuver the aircraft.

8. In an aircraft, a single rotor constituting the major sustaining means in vertical flight, comprising a rotative hub and an aeroform blade capable of autorotation, with blade mounting mechanism connecting the root end of the blade with the hub, pitch changing mechanism including a pivotal bearing through which the blade is mounted to be moved relative to the hub for change of pitch, the blade mounting mechanism incorporating another pivotal bearing providing for swinging movement of the blade in a direction generally transverse its mean rotative path of travel to accommodate variable aerodynamic forces independently of the operation of the said pitch change bearing, and disconnectible rotor drive means constructed with a transmission ratio to effect driven operation of the rotor at higher than mean autorotational flight R. P. M. and providing for autorotational operation of the rotor in vertical descent without power, and the rotor blade pitch changing mechanism being constructed to provide for pitch variation of the blade between an angle ineffective to lift the craft vertically and a substantial positive lift angle, whereby the parts cooperate to provide for driven operation of the rotor when the aircraft is on the ground at higher than mean autorotational flight R. P. M. with the rotor blade pitch reduced to such ineffective angle and for increase of rotor blade pitch to convert kinetic energy stored in the rotor into lift.

9. In an aircraft, a single rotor constituting the major sustaining means in vertical flight, comprising a hub and at least one autorotatable blade, blade mounting mechanism connecting the blade with the hub comprising pivotal bearing means providing for blade pitch movement relative to the hub between an angle ineffective to raise the aircraft vertically and an appreciable positive lift angle higher than the mean autorotational angle, the mounting mechanism further including a pivot pin operative independently of said pivotal bearing to provide freedom for blade swinging movement in a direction generally transverse the mean rotative path of travel, and disconnectible rotor drive means constructed with a transmission ratio to effect driven operation of the rotor with the blade at such ineffective pitch angle and at an R. P. M. higher than the mean autorotational flight R. P. M., when the aircraft is on the ground, and providing for autorotational operation of the rotor at an autorotational blade pitch angle in vertical descent.

10. In an aircraft having power means for forward translation, normally air actuated means comprising an autorotational rotor for sustention, said rotor including a hub and a plurality of sustaining blades, means providing for the transmission of power from said power means to said rotor, mechanism mounting the rotor blades for movement relative to said hub for variation of their pitch angles including reduction of said blade pitch angles during the transmission of the starting power to a value less than that normally utilized in autorotational flight and for subsequent increase of pitch angles, pivotal mounting means for the blades operative independently of said variable pitch mounting to accommodate vertical swinging of said blades substantially independently of pitch variation, and controllable means for positively maintaining the blade pitch angle, uniformly as to the several blades, at said reduced value during transmission of power to the rotor.

11. In an aircraft, a single sustaining rotor constituting the principal lifting means at least in vertical flight of the craft and comprising a plurality of aeroform blades actuable autorotationally as well as by power, mechanism mounting the blades by their root ends to rotate about a generally upright axis in vertical flight, said mechanism comprising pivotal bearing means providing for pitch change movement of each blade as a unit between a mean autorotational pitch angle and an appreciably higher positive pitch angle and further comprising additional pivotal bearing means providing freedom independently of the operation of the first-mentioned pivotal bearing means for the blades to swing in a direction generally transverse their mean rotative path of travel, power means for positively rotating the rotor blades at such R. P. M. as to store substantial kinetic energy therein with the blades adjusted to a lowered pitch angle and adapted to accommodate free autorotation of said blades at least for descent without power, and controllable means operative to move the blades uniformly to increased pitch angles whereby to utilize such stored kinetic energy when effecting vertical take-off of the craft.

12. The method of operating an aircraft, of the type incorporating a system of rotative sustaining blades mounted by pitch change means and by means accommodating vertical blade swinging and capable of autorotative actuation by relative air flow and further incorporating power means for rotating the blades, which method comprises utilizing power from said power means to rotate said blades while on the ground up to a speed substantially in excess of their mean autorotational speed, with said blades at a reduced pitch ineffective to raise the aircraft vertically, maintaining said pitch substantially uniform as to the several blades during the said utilization of power, and thereafter cutting off the power and raising the pitch of the blades, uniformly as to the several blades, to such angle as will effect a vertical take-off of the aircraft by virtue of the kinetic energy of the rotating blades.

13. The method of operating an aircraft, of the type incorporating a system of rotative sustaining blades mounted by pitch change means and by means accommodating vertical blade swinging and capable of autorotative actuation by relative air flow and further incorporating power means for rotating the blades, which method comprises initially utilizing power from said power means to rotate said blades up to a speed substantially in excess of their mean autorotational speed, with said blades at a reduced pitch ineffective to raise the aircraft vertically, maintaining said pitch substantially uniform as to the several blades during the acceleration of rotation of said blades, and thereafter raising the blade pitch, uniformly as to the several blades, to such angle as to convert kinetic energy into take-off lift.

14. The method of operating an aircraft, of the type incorporating a system of rotative sustaining blades mounted by pitch change means and by means accommodating vertical blade swinging and capable of autorotative actuation by relative air flow and further incorporating power means for rotating the blades, which method comprises initially utilizing power from said power means to rotate said blades up to a speed substantially in excess of their mean autorotational speed, with said blades at a reduced pitch ineffective to raise the aircraft vertically, maintaining said pitch substantially uniform as to the several blades during the acceleration of rotation of said blades, thereafter raising the blade pitch, uniformly as to the several blades, to such angle as to convert kinetic energy into take-off lift, and controlling the aircraft, at least during the take-off, by controlling the position of the thrust vector of the rotor blades relative to the center of gravity of the craft.

15. The method of operating an aircraft, of the type incorporating a system of rotative sustaining blades mounted by pitch change means and by means accommodating vertical blade swinging and capable of autorotative actuation by relative air flow and further incorporating power means for rotating the blades, which method comprises initially utilizing power from said power means to rotate said blades up to a speed substantially in excess of their mean autorotational speed, with said blades at a reduced pitch ineffective to raise the aircraft vertically, maintaining said pitch substantially uniform as to the several blades during the acceleration of rotation of said blades, thereafter raising the blade pitch, uniformly as to the several blades, to such angle as to convert kinetic energy into take-off lift, and controlling the aircraft, at least during the take-off, by controlling the position of the thrust vector of the rotor blades relative to the center of gravity of the craft by cyclically varying the pitch angles of the blades.

16. The method of operating an aircraft, of the type having a forward propulsion power plant and a system of rotative sustaining blades mounted by pitch change means and by means accommodating vertical blade swinging and capable of autorotative actuation by relative air flow, which method comprises delivering power from said power plant to rotate said blades up to a speed substantially in excess of their mean autorotational speed, with said blades at a reduced pitch ineffective to raise the aircraft vertically, maintaining said pitch substantially uniform as to the several blades during the application of power thereto, and thereafter cutting off the delivery of power to the blades and raising the pitch thereof, uniformly as to the several blades, to such angle as will effect a vertical take-off of the craft by virtue of the kinetic energy of the rotating blades, and continuing the rotation of said blades, autorotationally, at a reduced speed and an intermediate pitch by effecting a forward translational movement of the craft.

17. The method of operating an aircraft, of the type incorporating a system of rotative sustaining blades mounted by pitch change means and by means accommodating vertical blade swinging and capable of autorotative actuation by relative air flow and further incorporating power means for rotating the blades, which method comprises initially utilizing power from said power means to accelerate said blades while on the ground up to a speed substantially in excess of their mean autorotational speed, with said blades at a reduced pitch ineffective to raise the aircraft vertically, maintaining said pitch substantially uniform as to the several blades during said acceleration of the blades, and thereafter raising the blade pitch, uniformly as to the several blades, to such angle as to convert kinetic energy into take-off lift, and, at a given translational flight speed, maintaining a substantially constant R. P. M. of said blades by raising and lowering the mean blade pitch respectively with increase and decrease of R. P. M. in a pitch range between the value employed when initially accelerating the rotor blades on the ground and the value employed to develop take-off lift.

18. An aircraft including power means for forward translation, normally air actuated means comprising an autorotational rotor for sustention, means providing for the transmission of torque from said power means to said rotor, means for lowering the pitch angle of the rotor blades during the application of power thereto and for subsequently raising said pitch angle whereby said rotor is adapted to effect vertical ascent, means providing for free rotation of said rotor for vertical descent, and means for controllably tilting the axis of said rotor whereby to effect control of the aircraft during all of said maneuvers regardless of whether said power means is producing a translational movement or not.

19. In an aircraft, forward propulsion means including an engine, a normally freely rotative sustaining rotor including a generally upright hub and an autorotatable blade mounted thereon, disconnectible drive means coupling said engine to said rotor, means for lowering the pitch of said blade during operation of said drive means and for thereafter raising said pitch, and mechanism controllable independently of the foregoing for varying the position of the rotor axis whereby to control the aircraft during all flight maneuvers regardless of whether said propulsion means is effecting any substantial forward translational movement of the craft.

20. An aircraft including power means for forward translation, normally air actuated means comprising an autorotational rotor for sustention, said rotor incorporating a hub and a blade, means providing for the transmission of torque from said power means to said rotor, means for moving the rotor blade with respect to the rotor hub for lowering the pitch angle thereof during the application of power thereto and for subsequently raising said pitch angle whereby said rotor is adapted to effect a substantial increase of thrust at the moment of take-off, means providing for free rotation of said rotor for vertical descent, and means for controllably tilting said rotor hub whereby to effect control of the aircraft during all of said maneuvers regardless of whether said power means is producing a translational movement or not.

21. A rotative-winged aircraft having a fuselage and a single multi-bladed and normally freely rotating sustaining rotor adapted to be aerodynamically driven in normal flight by the relative air-flow and having its blades pivoted to compensate for inequalities of effective lift of the blades on opposite sides of the craft, means for tilting the rotor-hub axis longitudinally and transversely with respect to the fuselage, means for varying the pitch of the blades, and a manual control device common to said tilting means and said pitch varying means comprising a stick pivoted for movement in two planes to govern the tilting of said hub and a vertically slidable element mounted on said stick for controlling the pitch of the blades in accordance with its vertical disposition relative to said stick.

22. Rotary wing aircraft comprising a supporting structure, a lever pivoted to the supporting structure and forming a journal and comprising a tilting control means, a secondary lever pivoted on said journal and comprising a secondary tilting control means, a hub journalled on said secondary lever, blades mounted on said hub so as to provide variable pitch angle relation, reciprocable means for simultaneously changing the pitch angles of all of said blades, manual means for selectively reciprocating said last mentioned means to secure predetermined pitch angle conditions, governing means operatively associated with and effective upon said reciprocating means to urge the blades toward a substantially predetermined pitch angle, and manual means for selectively tilting said first two mentioned levers.

23. A rotative-winged aircraft having a single multi-bladed and normally freely rotating sustaining rotor adaptd to be aerodynamically driven in normal flight by the relative air-flow and having its blades pivoted to compensate for inequalities of effective lift of the blades on opposite sides of the craft, means for controlling the attitude of said aircraft in flight, a prime mover carried by said aircraft extraneously of the rotor, a power driven propeller to give forward propulsion to the craft, means for transmitting power from said prime mover to said rotor for an interval while the aircraft is on the ground, and means for decreasing the pitch of the rotor blades to approximately their neutral angle during such transmission and for increasing the pitch of the rotor blades after such transmission to a more positive angle, whereby the initial rotative speed of the rotor may be substantially increased above its normal aerodynamically produced rotative speed during such power transmission, without however exerting a corresponding lift on the craft, and whereby the excess kinetic energy thus stored in the rotor while the craft is grounded may be converted into excessive lift by the increase of the pitch of the rotor blades for producing excessive lift for the take-off, and governing means for automatically and continually urging the blades toward a substantially predetermined angle of attack.

24. A rotative-winged aircraft having a single multi-bladed and normally freely rotating sustaining rotor adapted to be aerodynamically driven in normal flight by the relative air-flow and having its blades pivoted to compensate for inequalities of effective lift of the blades on opposite sides of the craft, a prime mover carried by said aircraft extraneously of the rotor, a power driven propeller to give forward propulsion to the craft, means for transmitting power from said prime mover to said rotor for an integral while the aircraft is on the ground, and means for decreasing the pitch of the rotor blades to approximate their neutral angle during such transmission and for increasing the pitch of the rotor blades after such transmission to a more positive angle, whereby the initial rotative speed of the rotor may be substantially increased above its normal aerodynamically produced rotative speed during such power transmission, without however exerting a corresponding lift on the craft, and whereby the excess kinetic energy thus stored in the rotor while the craft is grounded may be converted into excessive lift by the increase of the pitch of the rotor blades for producing excessive lift for the take-off, and automatic means mounted on the rotor for urging the blades to a substantially predetermined angle of incidence toward maintenance of substantially constant rotational speed for said rotor.

25. A rotative-winged aircraft having a plurality of blades mounted on a central hub and capable of being driven by the relative air flow in flight, a body having a cockpit, means operated from the cockpit for adjusting the pitch angle of said blades to low incidence while bringing the rotor up to speed, said means operative to then adjust the blades to high incidence for vertical take-off, said blade incidence adjustment means having cooperative governing means which urge the blades toward an angle of attack which will promote normal rotational speed of said blades and which functions regardless of actual angles of incidence.

26. Aircraft embodying a hub, blades connected to the hub and capable of being driven by the airflow past them in flight, and comprising with the hub a rotor, power means operatively associated with the hub for driving same on the ground to develop a relatively high rotative speed, manual means of adjusting the pitch angles of the blades in flight and on the ground so as to permit the power rotation of the rotor with the blades at such small angles as to develop inappreciable thrust with storage of kinetic energy in the rotor, said manual means effective to change the pitch angles of the blades so as to convert such stored kinetic energy into lift, and means mounted on the rotor and auxiliary to the blades cooperating with the named pitch change means automatically effective to urge the blades to auto-rotative pitch angles.

27. In an aircraft embodying rotative blades connected to the axis of rotation and normally driven by the air flow through them in flight, governing means in the form of revolving weights with cooperating blade incidence adjustment means which automatically tend to maintain a constant rotational speed for said rotative blades.

28. Aircraft comprising a hub, blades mounted on the hub and arranged for variable pitch angles and comprising with the hub a rotor, means manually actuated to govern the pitch angles of the blades, centrifugal means operatively associated with the rotor and responsive to increase of rotational speed to urge the blades toward increased pitch angles, and adjustable resilient means operatively associated with the centrifugal means to vary the speed at which such urge is neutralized.

29. Aircraft comprising a rotatable wing system the blades of which have variable pitch angles, said system being adapted to accommodate differential flight forces, means for manually changing said pitch angles, governing means for changing said pitch angles, and means modifying the effectiveness of the governing means to change the speed at which the pitch angles are affected.

30. A rotative-winged aircraft having a rotor comprising blades mounted on a central hub, means for adjusting the pitch angles of said blades, and centrifugal spring biased governing means mounted on the rotor associated with said pitch adjusting means which urges said blades toward an angle of attack which will promote normal rotational speed of said blades.

31. An aircraft comprising a rotor having blades, means for adjusting the pitch angles of said blades in flight, and means under centrifugal load and spring tension for affecting the pitch of the blades, said means in part at least mounted on the rotor.

32. A rotative-winged aircraft having blades pivotally mounted at a central hub, said blades adjustable in pitch angle at said pivots, governing means comprising parts operatively associated with a blade and its said pivot for automatically during flight urging the blade toward a given angle of attack.

33. In an aircraft embodying rotative blades capable of being driven by the relative air flow in flight, said blades hingedly connected to an extension link, said extension link connected to a central rotative hub, means for adjusting the pitch angles of said blades in flight and governing means mounted within each blade cooperating with said pitch adjusting means and automatically tending to maintain normal rotational speed of said blades.

34. Aircraft embodying a hub having an axis of rotation, blades connected to the hub and capable of being driven by the air flow through them in flight and comprising with the hub a rotor, means for changing the pitch angles of the blades in flight and governing means auxiliary to the blades located on the rotor for urging the blades to such pitch angle as to maintain an approximately predetermined rotational speed of the rotor.

35. A rotative-winged aircraft having a plurality of blades mounted on a central hub and capable of being driven by the relative air flow in flight, comprising means for adjusting the pitch angles of said blades in flight, and auxiliary governing means mounted adjacent to said hub and cooperating with said pitch adjusting means for automatically maintaining substantially normal rotational speed of said blades.

36. Aircraft comprising a hub, blades mounted on the hub and arranged for variable pitch angles and comprising with the hub a rotor, means manually actuated to govern the pitch angles of the blades, and centrifugal means operatively associated with the rotor and responsive to increase of rotational speed to urge the blades toward increased pitch angles.

37. In aircraft, a rotatable wing system comprising a rotor having blades which have variable pitch angles, means for manually changing said pitch angles, and supplemental governing means in part at least mounted on the rotor for changing the pitch angles of said blades.

38. Aircraft comprising a hub, blades mounted on the hub and arranged for variable pitch angles and comprising with the hub a rotor, centrifugal means operatively associated with the rotor and responsive to variations of rotational speed to urge the blades toward changed pitch angles, and means manually actuated to override the centrifugal governor means to provide for positive manual setting of the pitch angle.

39. A rotative-winged aircraft having blades mounted on a central hub, said hub rockably mounted on trunnions and connected to a control member for controlling the attitude of said aircraft, means for adjusting the pitch angles of said blades, control means for the last mentioned means located with constant reference to said control member, and governor means for adjusting the pitch of the blades automatically as a function of rotative speed of the rotor, said control means being arranged to nullify the action of the governor means.

40. Aircraft comprising a rotatable wing system the blades of which have variable pitch angles, governing means for changing said pitch angles as a function of speed of rotation of the system, an adjustable pilot's control, and connections between the pilot's control and blades to adjust the control as a function of the instantaneous pitch angles of the blades, said pilot's control and connections being such as to be manually adjustable to change the pitch of the blades in opposition to the governor-controlled pitch adjustment.

41. A rotative-winged aircraft having a rotor comprising blades mounted on a central hub, means mounting the blades for pitch change adjustments, movable means for changing the pitch of the blades, a manual control device, connections between the control device and the pitch changing means for manually changing the pitch of the blades, and governor means operative upon the connections in series with the control device to change the pitch angles of said blades as a function of the rotative speed of the rotor.

42. A rotative winged aircraft having a sustaining rotor comprising a rotatable hub and a blade pivotally connected therewith for upward and downward swinging movement to compensate for differential lift effects in translational flight, the blade mounting on the hub further incorporating means providing for variation of blade pitch angle, means manually actuated to govern the pitch angle of the blade, and centrifugal means operatively associated with the rotor and responsive to variations of rotational speed to urge the blade toward changed pitch angle.

43. A rotative winged aircraft having a rotor comprising blades mounted on a central hub, means mounting the blades on the rotor for pitch change adjustments, control means for controlling the attitude of the aircraft, a control member connected to the control means and movable bodily fore and aft of the aircraft to control the attitude of the aircraft, governing means operably associated with the mounting means for changing the pitch of the blades as a function of the speed of rotation of the rotor, a floating control device mounted on and movable relative to the control member, connections between the floating control device and the mounting means for the blades to variably position the device as a function of the instantaneous pitch angles of the blades, said connections enabling fore and aft movement of the control member without affecting the instantaneous pitch angles of the blades, and further so arranged that the relative position of the device and control member can be manually changed to change the pitch of the blades in opposition to governor-controlled pitch adjustment.

44. In an aircraft embodying rotative blades hingedly connected to a central rotative hub and normally driven by the air flow past them in flight, means of adjusting the pitch angles of said blades in flight and cooperating governor means located on the rotor for maintaining an approximate constant rotational speed of said blades.

45. A rotative winged aircraft having a blade mounted on a rotatable hub, means for changing the pitch angle of said blade in flight, cooperating governing means tending to control said change in pitch angle, and cooperating means operable upon contact with a supporting surface for the aircraft to automatically alter the pitch angle of the blade.

46. A rotative-winged aircraft having blades mounted on a central hub and normally driven by the relative air flow in flight, means for changing the pitch angle of said blades in flight, and cooperating governing means resisting said change in pitch angle, auxiliary cooperating means comprising a landing feeler arranged to promote an increase in the pitch angles of the blades upon its contact with the landing field.

47. Aircraft comprising a rotatable wing system, the blades of which have variable pitch angles, means for manually changing said pitch angles, governing means located on the rotor for constantly tending to maintain said pitch angles at a given angle of incidence, and auxiliary means comprising a landing feeler operatively coupled with said manual means arranged to promote an increase in the pitch angles of the blades upon its contact with the landing field.

RICHARD H. PREWITT.